(12) United States Patent
Behzadi

(10) Patent No.: US 7,088,679 B2
(45) Date of Patent: Aug. 8, 2006

(54) METHOD AND SYSTEM FOR PROVIDING FAILURE PROTECTION IN A RING NETWORK THAT UTILIZES LABEL SWITCHING

(75) Inventor: Behnam Behzadi, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 959 days.

(21) Appl. No.: 10/021,754

(22) Filed: Dec. 12, 2001

(65) Prior Publication Data
US 2003/0108029 A1 Jun. 12, 2003

(51) Int. Cl.
*H04L 12/26* (2006.01)
(52) U.S. Cl. .................. 370/230; 370/231; 370/428
(58) Field of Classification Search ........ 709/238–243, 709/251–252; 370/351–352, 230, 231, 428
See application file for complete search history.

(56) References Cited

U.S. PATENT DOCUMENTS

| | | | |
|---|---|---|---|
| 6,034,961 A | 3/2000 | Masuo et al. | |
| 6,130,889 A * | 10/2000 | Feldman et al. | 370/397 |
| 6,222,848 B1 | 4/2001 | Hayward et al. | |
| 6,408,001 B1 * | 6/2002 | Chuah et al. | 370/392 |
| 6,501,756 B1 | 12/2002 | Katsube et al. | |
| 6,530,032 B1 * | 3/2003 | Shew et al. | 714/4 |
| 6,532,088 B1 | 3/2003 | Dantu et al. | |
| 6,535,481 B1 | 3/2003 | Andersson et al. | |
| 6,862,288 B1 * | 3/2005 | Sharma et al. | 370/403 |
| 2001/0017866 A1 | 8/2001 | Takada et al. | |
| 2002/0054405 A1 * | 5/2002 | Guo et al. | 359/118 |
| 2002/0093954 A1 * | 7/2002 | Weil et al. | 370/389 |
| 2002/0109879 A1 * | 8/2002 | Wing So | 359/118 |
| 2003/0021225 A1 * | 1/2003 | Klink | 370/222 |

FOREIGN PATENT DOCUMENTS

WO WO 01/29682 A1 4/2001

OTHER PUBLICATIONS

Owens, Ken et al., A Path Protection/Restoration Mechanism for MPLS Networks, IETF Draft, Nov. 2000.
Sharma, Vishal et al., Framework for MPLS-based Recovery, IETF Draft, Mar. 2001.
Gan, Der-Hwa, et al., A Method for MPLS LSP Fast-Reroute Using RSVP Detours, IEFT Draft, Apr. 10, 2001.

(Continued)

*Primary Examiner*—John Follansbee
*Assistant Examiner*—M. A. Siddiqi

(57) ABSTRACT

A working label switched path (LSP) between neighbor label switched routers (LSRs) in a ring network that utilizes label switching is protected by an LSP that connects the neighbor LSRs of the working LSP in an opposite direction to the working LSP. If the working LSP fails, then packets are switched to the protection LSP. Switched packets traverse the protection LSP until they reach the neighbor LSR that they would have reached had the packets traversed the working LSP. Time-to-live (TTL) values of packets that traverse the protection LSP are adjusted to account for the number of hops on the protection LSP so that the TTL values of the packets are the same after traversing the protection LSP as they would have been had they traversed the working LSP. After traversing the protection LSP packets can be switched back to the working LSP or switched to a next hop LSP.

11 Claims, 15 Drawing Sheets

OTHER PUBLICATIONS

Sonet Transport Systems: Common Criteria, Network Element Architectural Features, GR-253-CORE, Issue 2, Dec. 1995.

Mujie, Charles, Spatial Reuse Protocol (SRP) Technology Whitepaper (Version 4.0), Jan. 26, 2000.

Americal National Standards for Telecommunications, Synchronous Optical Network (SONET) Automatic Protection Switching, ANSI T1.105.01 1995.

S. Seetharaman, A. Durresi, R. Jagannathan, R. Jain, N. Chandhok, K. Vinodkrishnan, "IP Over Optical Networks: A Summary of Issues", IETF Standard-Working Draft, Internet Engineering Task Force, IETF, CH, No. 2, Apr. 2001.

Satoru Matsushima, Ken-Ichi Nagami, Hideo Ishii, Yuichi Ikejiri, "TTL Processing Expansion for 1-hop LSP", IETF Standard-Working-Draft, Internet Engineering Task Force, IETF, CH, No. 1, Jul. 2001.

E. Rosen, A. Viswanathan, R. Callon, "Multiprotocol Label Switching Architecture" IETF Standard, Internet Engineering Task Force, IETF, CH, Jan. 2001.

* cited by examiner

```
┌─────────────────────────────────────────────────┐
│ Identify a working LSP between first and second │
│ neighbor LSRs in a ring network, the working    │──2074
│ LSP having a first direction around the ring    │
│ network                                         │
└─────────────────────────────────────────────────┘
                        │
                        ▼
┌─────────────────────────────────────────────────┐
│ Establish a protection LSP between the first    │
│ and second neighbor LSRs for communicating      │
│ packets between the first and second neighbor   │
│ LSRs in the event of a failure of the link that │──2075
│ is utilized by the working LSP, the protection  │
│ LSP utilizing LSRs on the ring network and      │
│ having an opposite direction to the first       │
│ direction                                       │
└─────────────────────────────────────────────────┘
                        │
                        ▼
┌─────────────────────────────────────────────────┐
│ Switch packets from the working LSP to the      │
│ protection LSP in response to a failure of the  │──2076
│ link that is utilized by the working LSP        │
└─────────────────────────────────────────────────┘
                        │
                        ▼
┌─────────────────────────────────────────────────┐
│ Adjust TTL values of the switched packets by a  │
│ value that is a function of the number of LSRs  │──2077
│ along the protection LSP                        │
└─────────────────────────────────────────────────┘
                        │
                        ▼
┌─────────────────────────────────────────────────┐
│ Switch packets back to the working LSP from the │──2078
│ protection LSP after the packets have traversed │
│ the protection LSP                              │
└─────────────────────────────────────────────────┘
                        │
                        ▼
┌─────────────────────────────────────────────────┐
│ Use TTL values from packets that have traversed │
│ the protection LSP to generate TTL values for   │──2079
│ the packets that are switched back to the       │
│ working LSP from the protection LSP             │
└─────────────────────────────────────────────────┘
```

FIG. 20

METHOD AND SYSTEM FOR PROVIDING FAILURE PROTECTION IN A RING NETWORK THAT UTILIZES LABEL SWITCHING

CROSS REFERENCE TO RELATED APPLICATION

The present application is related to a prior application Ser. No. 09/865,035 filed May 24, 2001.

FIELD OF THE INVENTION

The invention relates to label switching, and more particularly to a method and system for providing failure protection in a ring network that utilizes label switching.

BACKGROUND OF THE INVENTION

In packet-switched networks, packets traveling from a source address to a destination address may be transmitted through many intermediate network nodes, such as switches or routers. Intermediate network nodes that receive packets headed for the destination address utilize look-up tables to determine the next hop for the packets. Label switching is a technique that has been developed to expedite the look-up process at each hop as packets travel from a source address to a destination address. In brief, label switching involves attaching a label to a packet that enables the next hop of the packet to be quickly determined by an intermediate network node that has received the packet. One label switching protocol that is being standardized by the Internet Engineering Task Force (IETF) is known as multi-protocol label switching (MPLS).

FIG. 1 depicts multiple network nodes 102 that utilize MPLS to forward packets through a mesh network. The network nodes are referred to as label switch routers (LSRs) and a group of interconnected LSRs define an MPLS domain 104. LSRs that are at the edge of the MPLS domain and provide an interface to non-MPLS network nodes are referred to as edge LSRs (also as ingress LSRs and egress LSRs with respect to packets that are entering or leaving the MPLS domain). The path that labeled packets travel through an MPLS domain is referred to as the label switch path (LSP). FIG. 1 depicts examples of two LSPs, working LSP 1 and protection LSP 1, which extend between LSRs in the MPLS domain. Although only two LSPs are depicted, an MPLS domain may include thousands of unique LSPs.

MPLS is often used in conjunction with the Internet protocol (IP) at the Network layer (layer 3) and a Data Link layer (layer 2) protocol such as Ethernet (IEEE 802.3x), asynchronous transfer mode (ATM), or Frame Relay. According to the MPLS protocol, an MPLS header, also referred to as a "shim header," is inserted between the Network layer header (the inner header) and the Data Link layer header (the outer header) to guide a labeled packet through an MPLS domain. Multiple shim headers can be stacked, as is known in the field, to support hierarchical operations. MPLS can also be used in a layer 2 environment where the shim header is located between two layer 2 headers.

FIG. 2 depicts an example of a labeled packet that includes an outer header 208 (i.e., a MAC header that includes a destination address, a source address, and a type field), a label switching header 210 (also referred to as the shim header), an inner header 212 and payload 214 (i.e., an IP header and an IP payload), and a MAC trailer 216 (i.e., the CRC). As described by the IETF (RFC 3032, January 2001) and shown in the expanded view of FIG. 2, an MPLS shim header includes a 20-bit MPLS label field 218, a 3-bit experimental use field 220, a 1-bit stacking field 222, and an 8-bit time-to-live (TTL) field 224. The MPLS label field carries the label value that is used to forward a packet to the next LSR. The experimental use field is not yet fully defined, the stacking field is used to identify when an MPLS header is the last MPLS header in a stack of MPLS headers, and the TTL field carries a TTL value that places a limit on the number of hops an MPLS packet can traverse within an MPLS domain.

As is well known in the field, packet-switched networks are currently being adapted to support traditional telecommunications traffic, such as voice communications. In order for packet-switched networks to support traditional telecommunications traffic, the packet-switched networks must include failure protection mechanisms that ensure a standard of reliability that meets or exceeds the reliability standards that are achieved by circuit-switched networks. For example, it is important that a label switched network can recover from an LSP failure within 50 milliseconds (ms).

In metropolitan areas, traditional circuit-switched traffic is often carried using ring network architectures. Ring networks are now being adapted to carry packet-switched traffic and label switching is being implemented on the ring networks to provide improved quality of service. In order for packet-switched ring networks to carry telecommunications traffic, they must ensure a standard of reliability that meets or exceeds the reliability standards of circuit-switched ring networks.

One failure protection technique that has been proposed for mesh-type MPLS-based networks involves establishing a unique protection LSP for each working LSP and switching packets from the working LSP to the protection LSP if the working LSP fails. For example, referring to the mesh network of FIG. 1, protection LSP 1 is established to provide a protection pathway for working LSP 1. If there is a failure of a link that is utilized by the working LSP, then packets that would have been sent on the working LSP are switched to the protection LSP. The TTL values of the packets that are switched to the protection LSP are set to allow the packets to traverse the number of hops on the protection LSP. After the switched packets have traversed all of the hops on the protection LSP, the shim headers are popped.

In the example of FIG. 1, if there is a failure of either one of the links that supports working LSP 1, then, according to the technique, packets that would have been sent on working LSP 1 are switched to protection LSP 1 and the TTL values are set to allow the packets to traverse the protection LSP. The switched packets traverse the protection LSP until the destination LSR is reached and then the protection LSP shim header is popped, causing the packets to exit the MPLS domain. While this technique works well in a mesh-type network, the technique does not work as well in a ring-type network because label switched packets may traverse multiple different LSPs around a ring before exiting the MPLS domain.

Another drawback to the above-described protection scheme is that packets traversing the protection LSP will arrive at the destination LSR on a different port than the port used by the working LSP. Having packets that previously arrived on one port suddenly arrive on a different port indicates to the receiving LSR that there has been a network topology change that must be learned. Topology learning consumes valuable processing time that could be used to perform other critical operations.

In view of the desire to use ring-type packet-switched networks to carry traditional telecommunications traffic and the problems of current failure protection techniques, what is needed is a failure protection technique for label switched ring networks that provides fast protection switching, that does not trigger additional topology learning, and that is easy to implement.

SUMMARY OF THE INVENTION

A working LSP between neighbor LSRs in a ring network that utilizes label switching is protected by establishing a protection LSP for the working LSP, where the protection LSP for the working LSP connects the neighbor LSRs of the working LSP in a direction around the ring that is opposite to the direction of the working LSP. If the link that is utilized by the working LSP fails, then packets from the working LSP are switched to the protection LSP. Switched packets traverse the protection LSP until they reach the neighbor LSR that they would have reached had the packets traversed the working LSP. That is, packets switched to the protection LSP traverse the ring network in the opposite direction of the working LSP until they arrive at the neighbor LSR that is on the other end of the failed link. In an embodiment, the TTL values of the packets that traverse the protection LSP are adjusted to account for the number of hops on the protection LSP so that the TTL values of the packets are the same after traversing the protection LSP as they would have been had they traversed the working LSP. Adjusting the TTL values of packets that traverse the protection LSP prevents label switched packets from having their shim header prematurely popped, causing the packets to exit the MPLS domain too early.

In an embodiment, after packets that have been switched to the protection LSP reach the neighbor LSR, they are switched back to the working LSP. The packets are switched back to the working LSP from the protection LSP without the encapsulated packet being read by the receiving port of the neighbor LSR. Because the packets are switched from the protection LSP back to the working LSP without being read by the receiving port of the neighbor LSR, the receiving port does not initiate any topology learning. Packets that are switched from the protection LSP back to the working LSP are subsequently handled by the neighbor LSR as if the packets had arrived at the neighbor LSP on the working LSP. The packets may continue to a next hop LSP on the ring network or the packets can exit the MPLS domain. In another embodiment, after reaching the neighbor LSR via the protection LSP, packets are switched directly to a next hop LSP on the ring network without the encapsulated packet being read by the receiving port.

An embodiment of a method for protecting an LSP between two LSRs in a ring network that utilizes a label switching protocol involves identifying a working LSP between first and second neighbor LSRs in the ring network, the working LSP having a first direction around the ring network, establishing a protection LSP between the first and second neighbor LSRs for communicating packets between the first and second neighbor LSRs in the event of a failure of the link that is utilized by the working LSP, the protection LSP utilizing the ring network and having an opposite direction to the first direction, and switching packets from the working LSP to the protection LSP in response to a failure of the link that is utilized by the working LSP.

In an embodiment of the method, packets are from the protection LSP back to the working LSP after the packets have traversed the protection LSP. In another embodiment of the method, packets are switched from the protection LSP to a next hop working LSP after the packets have traversed the protection LSP.

In an embodiment of the method, the TTL values of the packets are adjusted to account for the number of LSRs that are along the protection LSP. In a further embodiment, the TTL values are adjusted by adding N to the TTL values, where N is a function of the number of LSRs along the protection LSP.

Another embodiment of the method includes switching packets back to the working LSP from the protection LSP after the packets have traversed the protection LSP, and using TTL values from packets that have traversed the protection LSP to generate TTL values for the packets that are switched back to the working LSP from the protection LSP. In another embodiment, instead of switching the packets back to the working LSP, the packets are switched to a next hop working LSP.

In an embodiment, at least one protection LSP is established for each link between neighbor LSRs on the ring network.

In another embodiment, the LSRs utilize multiprotocol label switching (MPLS) to communicate packets around the ring network.

An embodiment of a system for protecting an LSP between two LSRs in a ring network that utilizes a label switching protocol includes a label switching module and a failure protection module associated with each LSR in the ring network. The label switching modules for each LSR identify a working LSP between the respective LSR and a neighbor LSR, with the working LSP having a first direction around the ring network. The failure protection module establishes a protection LSP between the LSR and the neighbor LSR that enables packets to be communicated between the LSR and the neighbor LSR in the event of a failure of the link that is utilized by the working LSP, with the protection LSP utilizing the ring network and having an opposite direction to the first direction. The failure protection module also switches packets from the working LSP to the protection LSP in response to a failure of the link that is utilized by the working LSP.

In an embodiment of the system, the failure protection module includes logic for switching packets from the protection LSP back to the working LSP after the packets have traversed the protection LSP. In another embodiment, the failure protection module includes logic for switching packets from the protection LSP to a next hop working LSP.

In an embodiment of the system, switching packets from the working LSP to the protection LSP includes adjusting TTL values of the packets to account for the number of LSRs that are along the protection LSP. For example, the TTL values can be adjusted by adding N to the TTL values, where N is a function of the number of LSRs along the protection LSP.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 20 depicts a process flow diagram of another method for protecting an LSP between two LSRs in a ring network that utilizes label switching in accordance with an embodiment of the invention.

DETAILED DESCRIPTION OF THE INVENTION

Figure 1:
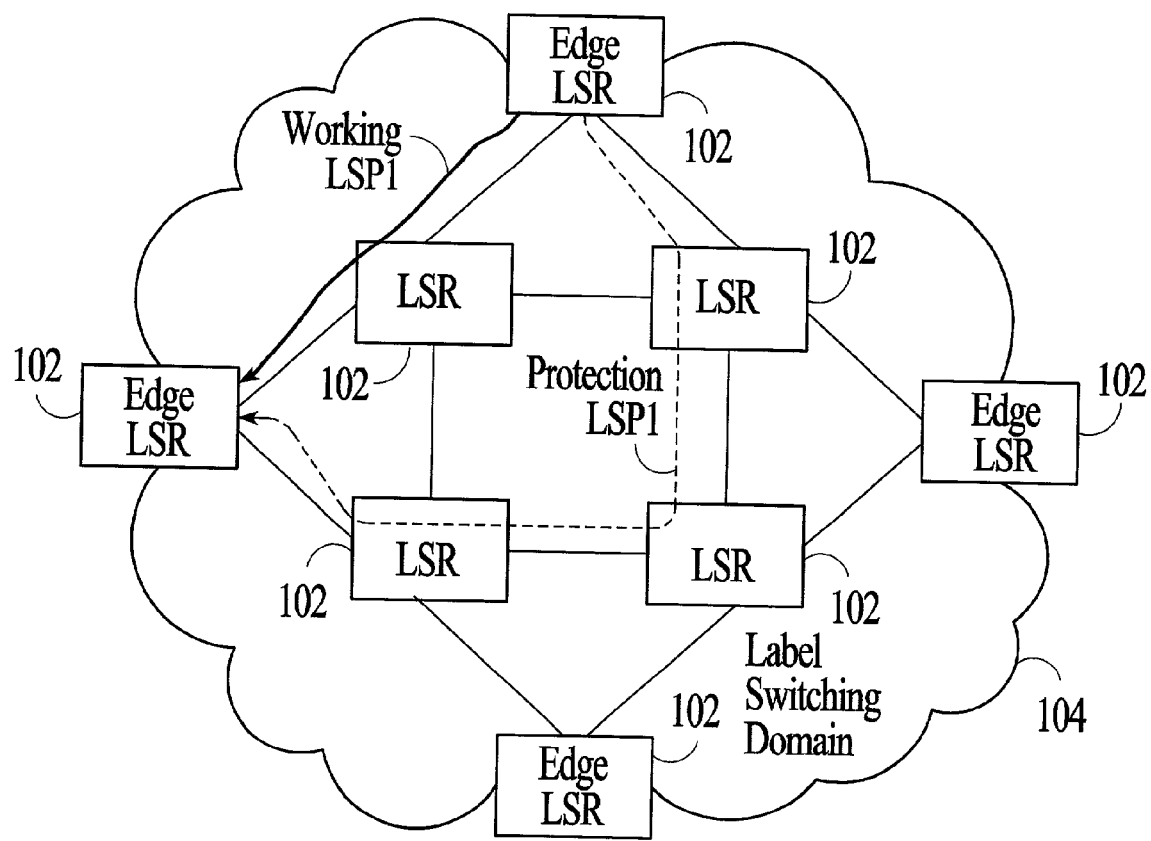
FIG. 1 depicts a group of network nodes in an MPLS domain that utilize MPLS to forward packets in accordance with the prior art.
Figure 2:
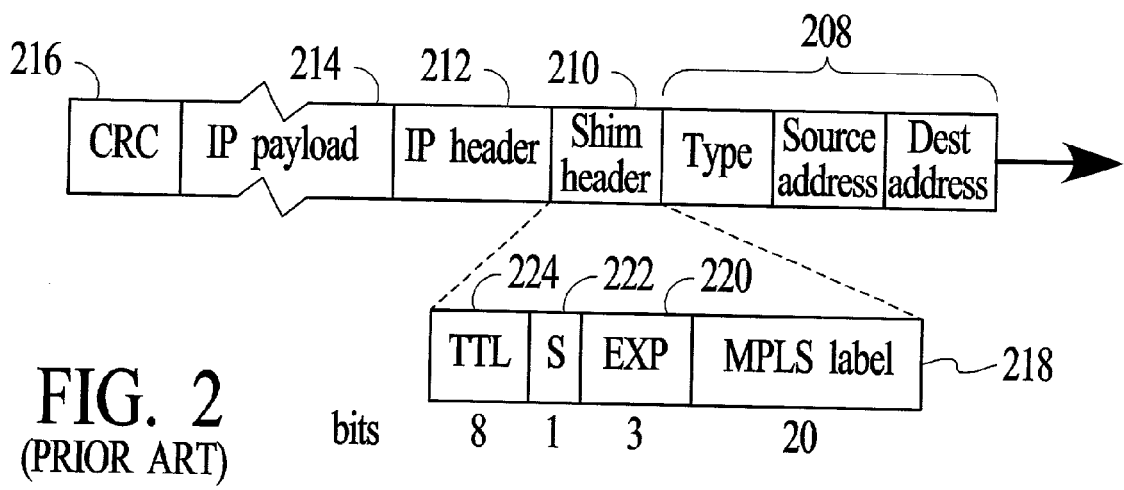
FIG. 2 depicts an example of a label switched packet that includes an IP header, an MPLS Shim header, and an Ethernet header in accordance with the prior art.
Figure 3:
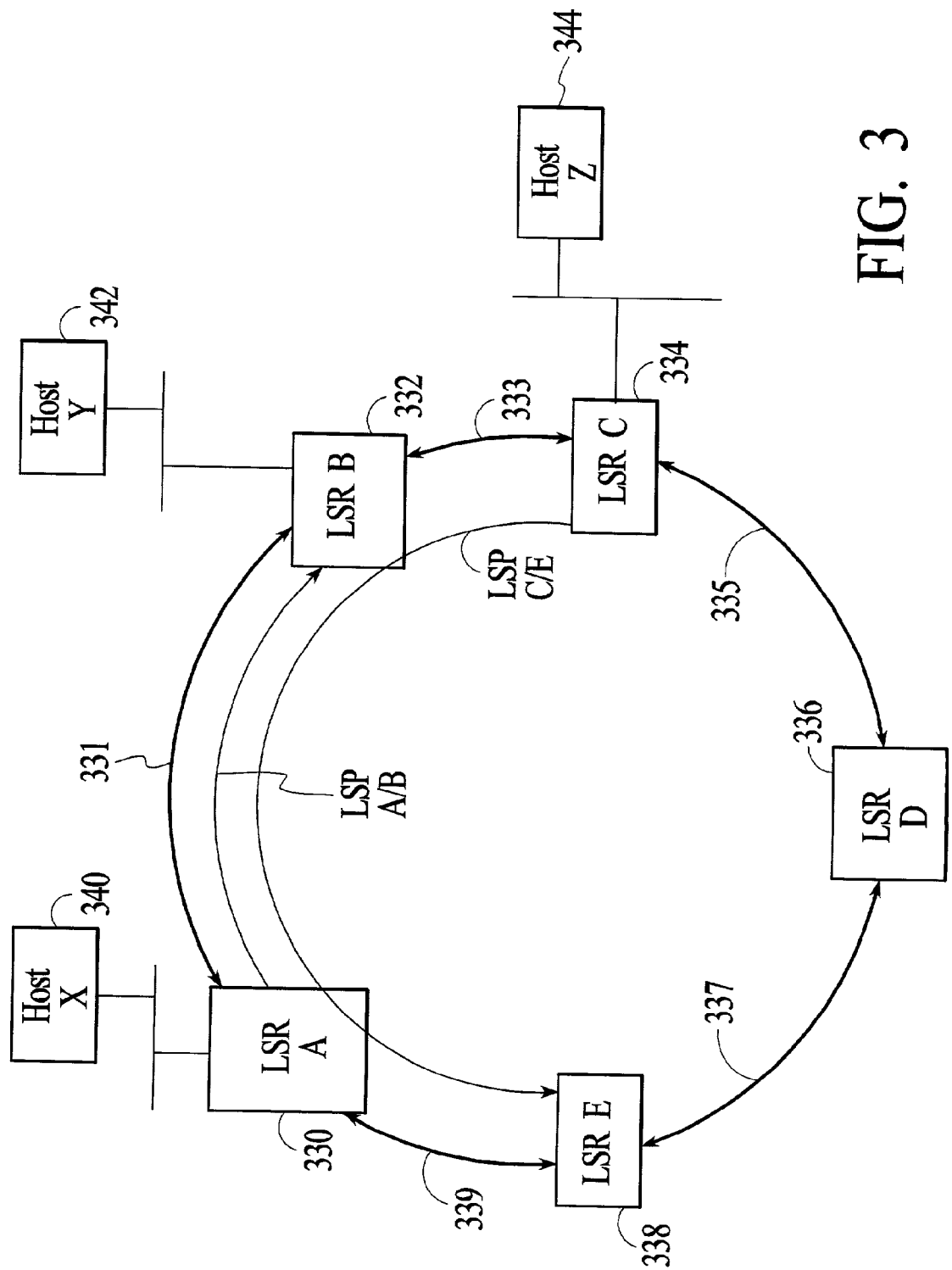
FIG. 3 depicts a group of LSRs that are connected by transmission links to form a ring with two example LSPs that traverse links within the ring network.

FIG. 3 depicts a group of network nodes 330, 332, 334, 336, and 338 that are connected by transmission links 331, 333, 335, 337, and 339 to form a ring. In the embodiment of FIG. 3, all of the network nodes on the ring support label switching, for example, the MPLS protocol that is published by the IETF, and are referred to herein as label switch routers (LSRs). All of the LSRs on the ring form an MPLS domain. Each of the LSRs on the ring has a right side neighbor and a left side neighbor, where for purposes of this description a neighbor LSR is defined as a directly adjacent LSR and left and right are defined at each LSR relative to a person standing at the LSR and facing the center of the ring. Each of the LSRs may be connected to other network nodes that are not part of the MPLS domain. For example, LSR A 330 is connected to Host X 340, LSR B 332 is connected to Host Y 342, and LSR C 334 is connected to Host Z 344. In the embodiment of FIG. 3, the links between neighbor LSRs include at least one optical fiber although the links may include more than one optical fiber, other media, and/or other intervening non-MPLS nodes. In the embodiment of FIG. 3, the LSRs 330–338 may utilize Ethernet, ATM, Frame Relay or any other Data Link layer (layer 2) protocol to transmit packets between the LSRs. In addition, the LSRs and Hosts may utilize any Data Link layer protocol to exchange packets.

In an MPLS-based network, labeled packets are transferred between LSRs via LSPs. An LSP may be defined between neighbor LSRs or between non-neighbor LSRs. Each hop between neighbor LSRs that a labeled packet makes within an MPLS domain is referred to as a label switched hop. A labeled packet may make multiple label switched hops within an MPLS domain. FIG. 3 depicts two different example LSPs that may exist within the MPLS domain. Throughout this description, LSPs are identified by their source LSR and their destination LSR, such that an LSP that runs from LSR A to LSR B is identified as LSP A/B. The source and destination LSRs of an LSP are referred to herein as path LSRs, which may be different from neighbor LSRs if the LSP extends over more than one label switched hop. Because the MPLS domain of FIG. 3 is a ring, the direction of each LSP from the source LSR to the destination LSR is indicated in each figure and can be characterized as clockwise or counter-clockwise. The two example LSPs depicted in FIG. 3 include LSP A/B and LSP C/E. LSP A/B runs from LSR A to LSR B in the clockwise direction and LSP C/E runs from LSR C to LSR E in the counter-clockwise direction.

In accordance with an embodiment of the invention, a working LSP between neighbor LSRs in a ring network that utilizes label switching is protected by establishing a protection LSP for the working LSP, where the protection LSP for the working LSP connects the neighbor LSRs of the working LSP in a direction around the ring that is opposite to the direction of the working LSP. If the link that is utilized by the working LSP fails, then packets from the working LSP are switched to the protection LSP. Switched packets traverse the protection LSP until they reach the neighbor LSR that they would have reached had the packets traversed the working LSP. That is, packets switched to the protection LSP traverse the ring network in the opposite direction of the working LSP until they arrive at the neighbor LSR that is on the other end of the failed link. In an embodiment, the TTL values of the packets that traverse the protection LSP are adjusted to account for the number of hops on the protection LSP so that the TTL values of the packets are the same after traversing the protection LSP as they would have been had they traversed the working LSP. After reaching the neighbor LSR, in an embodiment, the packets from the protection LSP are switched back to the working LSP. Packets that are switched back to the working LSP from the protection LSP are handled as if the packets had traversed the working LSP. For example, the packets may continue to be label switched around the ring network to reach the intended destination LSR or the packets can exit the MPLS domain.

Protection LSPs and TTL adjustments are pre-established so that protection switching can be performed quickly and easily in response to a failure of a link that is utilized by working a LSP. A failure of a link that is utilized by a working LSP may include a fiber cut or an unacceptable degradation in the quality of service, such as an unacceptably high bit error rate (BER) or latency. Failures can be detected by any technique and the specific failure detection technique used is not critical to the invention.

Figure 4:
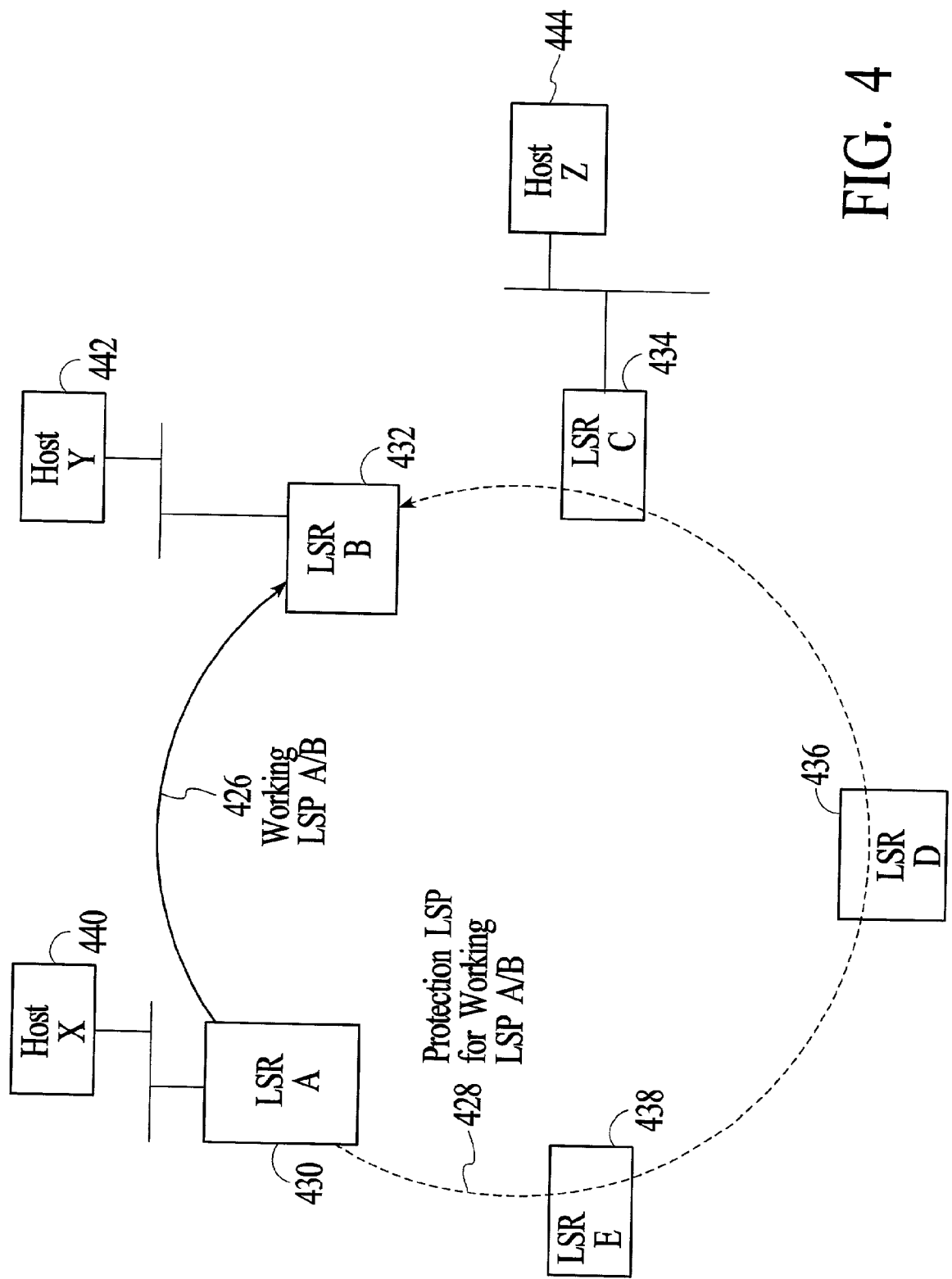
FIG. 4 depicts the ring network from FIG. 3 with an example working LSP and an example protection LSP for the working LSP in accordance with an embodiment of the invention.

FIG. 4 depicts the ring network from FIG. 3 with an example working LSP, working LSP A/B 426, and an example protection LSP, protection LSP A/B 428, for the working LSP. Throughout the description, similar reference numbers may be used to identify similar elements. The working LSP runs between neighbor LSRs from LSR A 430 to LSR B 432 in the clockwise direction and the protection LSP runs from LSR A to LSR B in the counter-clockwise direction. If a failure occurs on the link that is utilized by working LSP A/B, then packets that are labeled for working LSP A/B are switched to the protection LSP. Packets that are switched to the protection LSP traverse the protection LSP (in the opposite direction to the working LSP A/B) and are delivered to LSR B just as if the packets had traversed working LSP A/B (in the clockwise direction). In an embodiment, once the switched packets reach the end of the protection LSP (i.e., LSR B), the packets are switched back to their original working LSP and then handled as they would have been handled had the packets traversed working LSP A/B.

In a ring network, there may be multiple working LSPs utilizing the same link between neighbor LSRs. In one embodiment, all of the working LSPs that utilize the same link are protected in the same manner by protection LSPs that are specific to the particular working LSP. In an alternative embodiment, multiple working LSPs that utilize the same link may be protected by a single protection LSP. That is, in the case of a link failure, all of the working LSPs that utilize the failed link are switched to a single protection LSP. In another embodiment, different groups of working LSPs may be protected by different protection LSPs.

In an embodiment of the invention, at least one working LSP connects each neighbor LSR on the ring network and protection LSPs are established for each working LSP. The protection LSPs are all established as described with reference to FIG. 4, where each protection LSP connects the two neighbor LSRs of the particular working LSP in a direction around the ring that is opposite to the direction of the working LSP.

Figure 5:
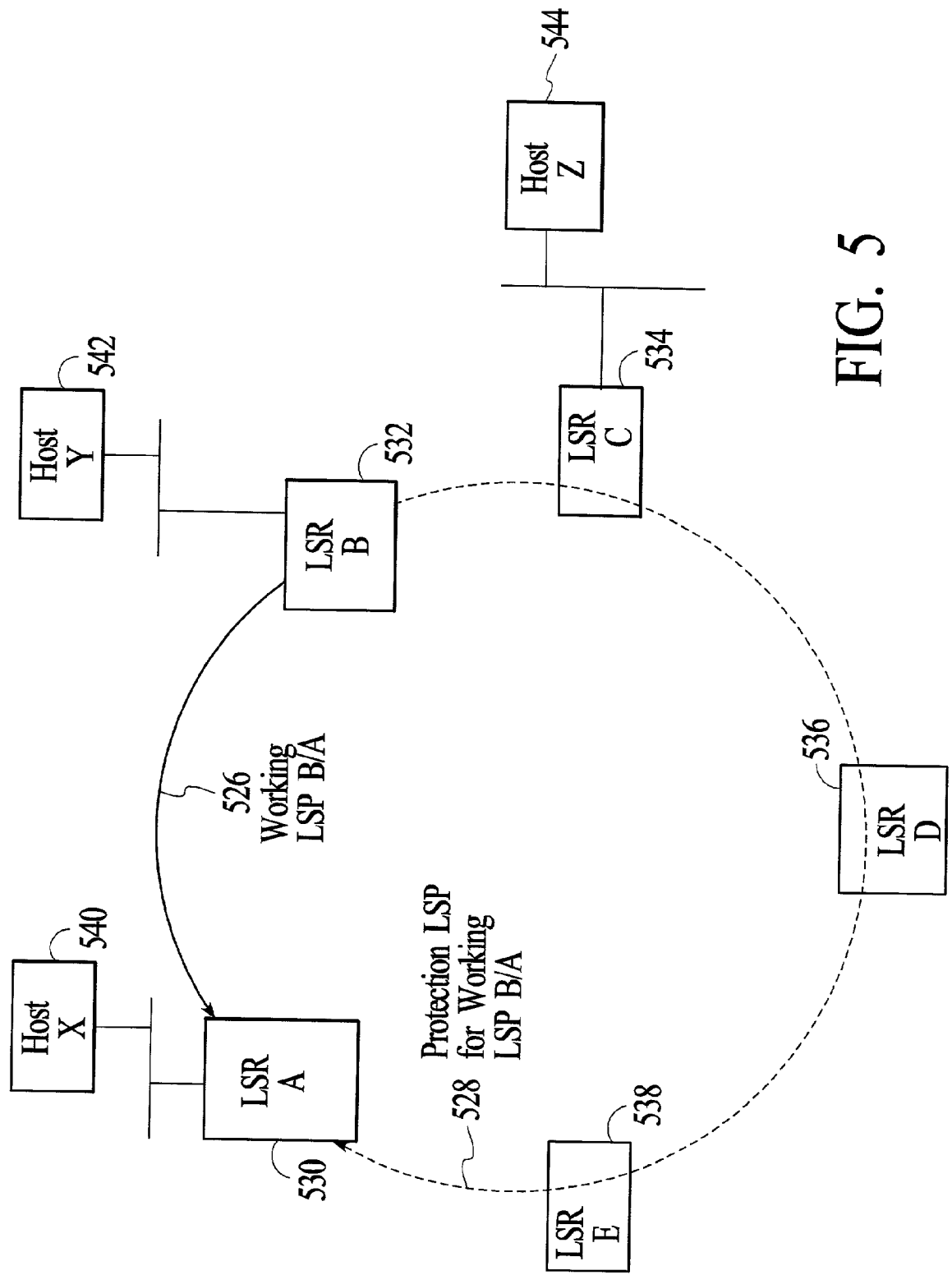
FIG. 5 depicts the ring network from FIG. 3 with an example working LSP and an example protection LSP for the working LSP in accordance with an embodiment of the invention, where the working LSP and the protection LSP run in the opposite direction to the working LSP and the protection LSP of FIG. 4.

While the link between LSR A 430 and LSR B 432 supports a working LSP that runs from LSR A to LSR B in the clockwise direction, the same link can also support a working LSP that runs from LSR B to LSR A in the counter-clockwise direction. FIG. 5 depicts the ring network of FIGS. 3 and 4 with an example working LSP 526 and an example protection LSP 528 that run in the opposite directions to the working LSP and protection LSP that are depicted in FIG. 4. The working LSP runs from LSR B 532 to LSR A 530 in the counter-clockwise direction and the protection LSP runs from LSR B to LSR A in the clockwise direction. If a failure occurs on the link that is utilized by working LSP B/A, then packets that are labeled for working LSP B/A are switched to the respective protection LSP. The switched packets traverse the protection LSP (in the opposite direction to the working LSP) and are delivered to LSR A just as if the packets had traversed working LSP B/A. In an embodiment, once the packets reach the end of the protection LSP, the packets are switched back to the original working LSP and then handled as they would have been handled had the packets traversed working LSP B/A.

Figure 6:
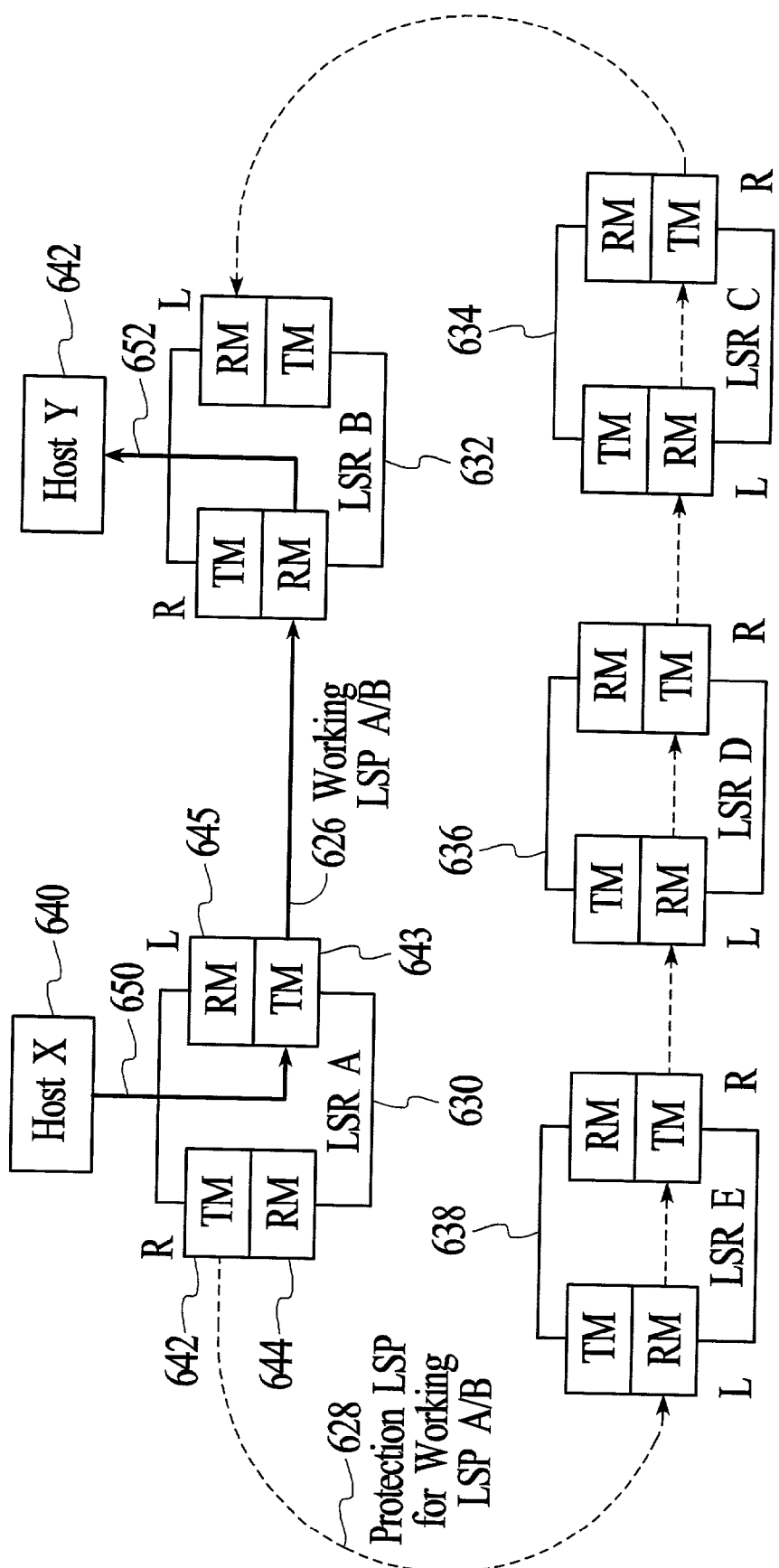
FIG. 6 depicts an expanded view of LSRs on a ring network, with an example working LSP and an example protection LSP for the working LSP, where the link between LSRs A and B is properly functioning in accordance with an embodiment of the invention.

FIGS. 6–10 depict a more detailed example of how a working LSP is protected in accordance with an embodiment of the invention. Referring to FIG. 6, it is desired to send packets from Host X 640 to Host Y 642, both of which are outside of the MPLS domain. The packets are sent from Host X to Host Y via connections 650 and 652 between the respective Hosts and LSRs and via working LSP A/B that is established between LSRs A and B. As described above with reference to FIG. 4, a protection LSP 628 is established for working LSP A/B 626. In the embodiment of FIG. 6, the protection LSP is specific to working LSP A/B, although this is not required. The protection LSP for working LSP A/B is indicated by the dashed line and runs from LSR A to LSR B in the counter-clockwise direction.

FIG. 6 also includes an expanded view of the LSRs 630–638 on the ring network. Each of the LSRs includes right side transmit and receive modules 642 and 644 (TM and RM) and left side transmit and receive modules 643 and 645. The transmit modules process and transmit packets to their neighbor LSR. For example, the left transmit module for LSR A processes and transmits packets to LSR B. The transmit modules include packet buffers and packet processors as is known in the field of MPLS-based networking. The receive modules process packets received from their neighbor LSRs. For example, the right side receive module for LSR B receives and processes packets received from LSR A. The receive modules include packet buffers and packet processors as is known in the field of packet-based networking.

Figure 7:
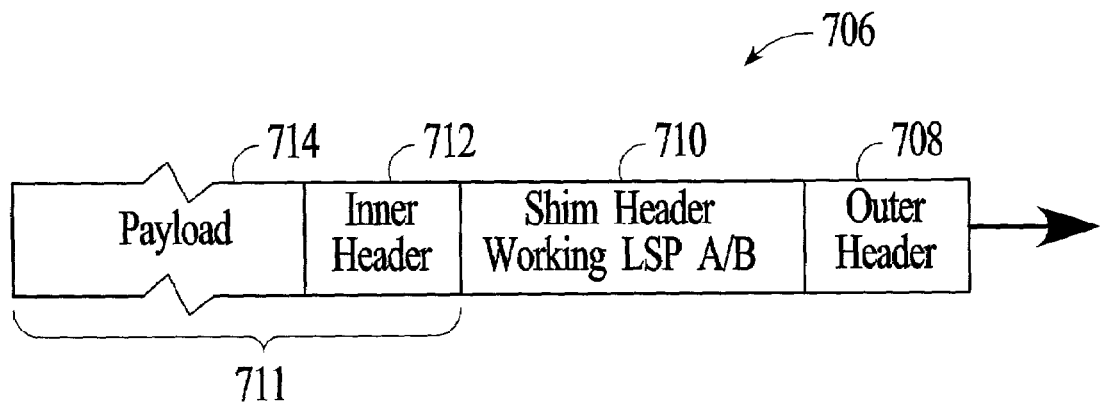
FIG. 7 depicts an example label switched packet that traverses the working LSP A/B that is depicted in FIG. 6.

FIG. 7 depicts an example label switched packet 706 that traverses working LSP A/B. The packet includes an outer header 708 that is used to traverse working LSP A/B, a shim header 710 that identifies working LSP A/B, and an encapsulated packet 711 that includes a header 712 (referred to herein as the inner header) and a payload 714 and possibly one or more trailers.

As long as the link that supports working LSP A/B is functioning properly, packets within the MPLS domain are forwarded from LSR A 630 to LSR B 632 using the working LSP. However, if there is a failure of the link that is utilized by working LSP A/B, for example a fiber cut or a degradation of the BER, then packets that were being sent across working LSP A/B are switched to the protection LSP.

Switched packets traverse the protection LSP from LSR A to LSR B in the counter-clockwise direction.

Figure 8:
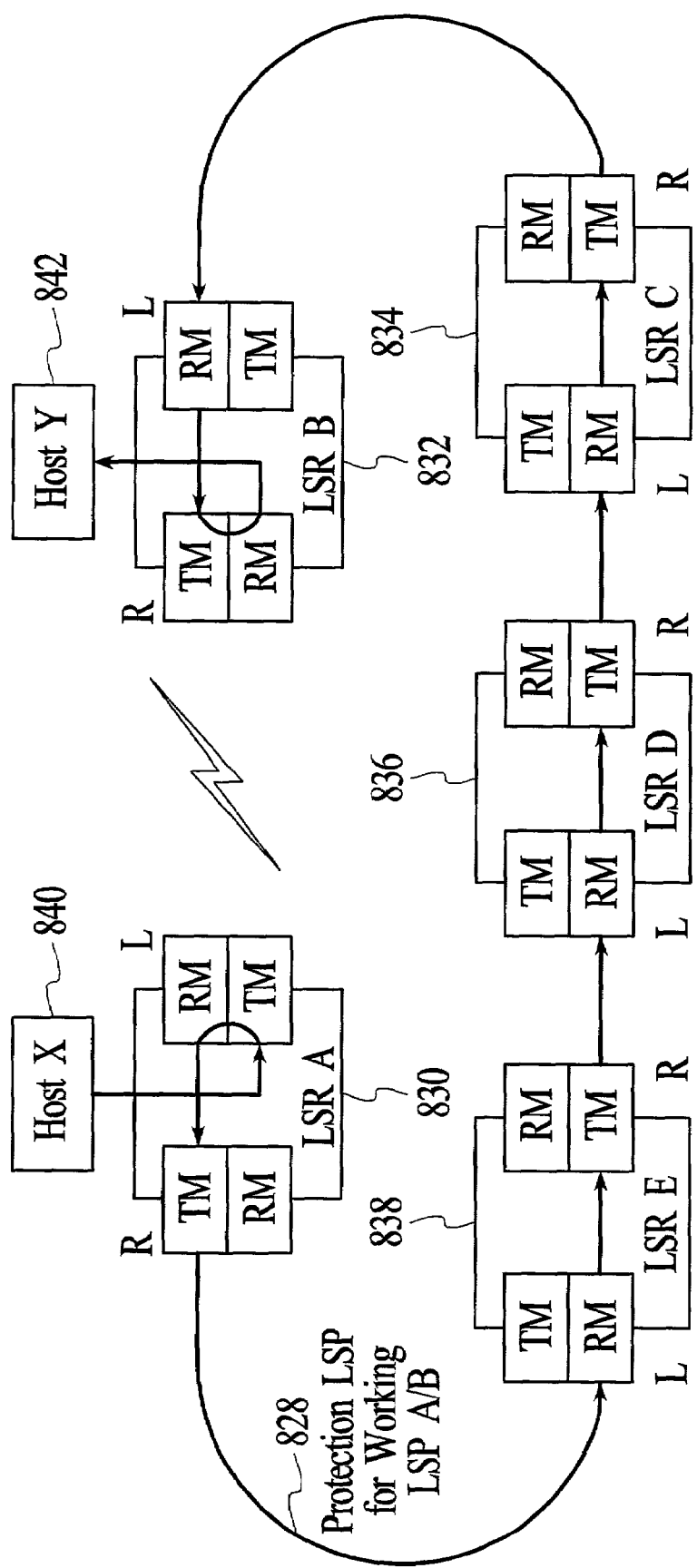
FIG. 8 depicts the ring network of FIG. 6 where the link between LSRs A and B has failed and packets are forwarded from LSR A to LSR B on the protection LSP in accordance with an embodiment of the invention.

FIG. 8 depicts an example of the path that packets traverse when there is a failure of the link between LSRs A and B 830 and 832. Referring to LSR A, packets that are received from Host X 840 and intended for working LSP A/B are still delivered to the left side transmit module and working LSP A/B just as if the link between LSRs A and B were operating satisfactorily. At the left side transmit module, the packets are switched, or "bounced," from the working LSP A/B to the protection LSP A/B. In an embodiment, switching the packets from the working LSP to the protection LSP involves switching the packets from the transmit module's buffer to the receive module's buffer and changing the shim header of the packet. Changing the shim header involves switching the MPLS label of the shim header from the working LSP label to the protection LSP label and adjusting the TTL field of the shim header. Adjusting the TTL field of the shim header is described in more detail below with reference to FIG. 9. Changing the MPLS label from the working LSP to the protection LSP also causes the outer header to be changed to identify the next hop LSR on the protection LSP. Changing the outer header is a simple task because the protection LSP has been pre-established.

Figure 9:
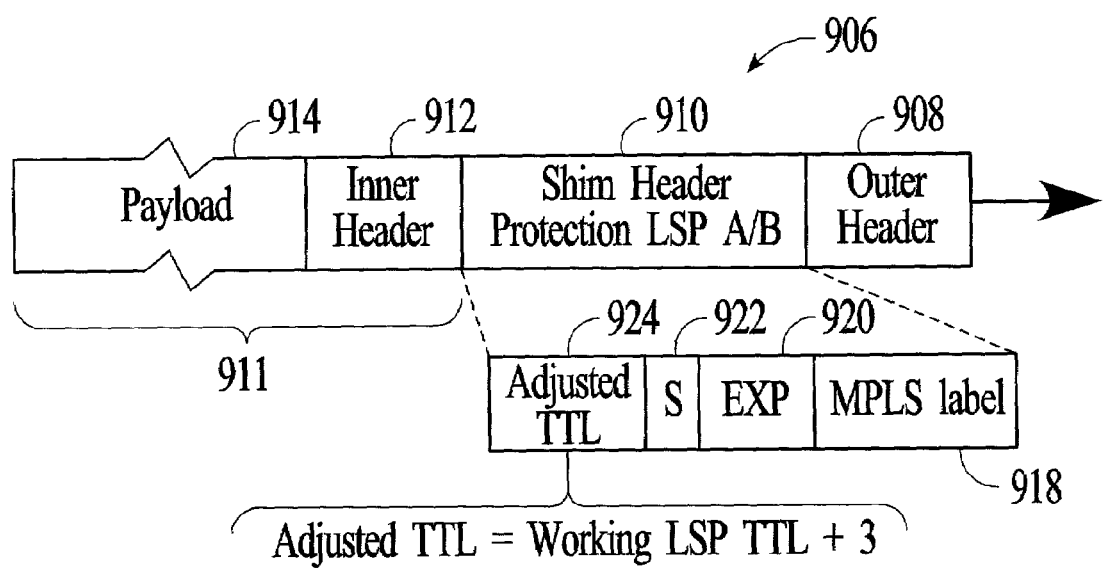
FIG. 9 depicts the packet from FIG. 7 in which the shim header has been changed, including adjusting the TTL value, so that the packet traverses the protection LSP instead of the working LSP in accordance with an embodiment of the invention.

FIG. 9 depicts the packet 906 from FIG. 7, in which the shim header 910 has been changed so that the packet traverses the protection LSP instead of the working LSP. Specifically, the MPLS label field 918 of the shim header is changed from identifying the working LSP A/B to identifying the protection LSP A/B. No changes are made to the header 912 and the payload 914 of the encapsulated packet 911. Because changing the shim header is the only action required to re-route packets from the working LSP to the protection LSP and because the protection LSP has been pre-established around the ring network, the protection process can be quickly and easily implemented. As the packets traverse the protection LSP, the header and the payload of the encapsulated packet are not examined by the intermediate LSRs. Because protection switching is controlled by LSRs that are directly connected to a failed link, link failures can be quickly and easily detected and the delay between a link failure and protection switching can be minimized. In contrast, other protection switching techniques may rely on upstream liveness messages from LSRs that could be many hops downstream to detect failures and initiate protection switching.

In addition to changing the MPLS label field of the shim header from the working LSP to the protection LSP, in accordance with an embodiment of the invention, the value of the TTL field (TTL value) in the shim header is adjusted when a packet is switched from its working LSP to its protection LSP. The TTL value is adjusted to account for the additional number, N, of hops that exist between LSR A and LSR B along the protection LSP. That is, the TTL value of a packet that arrives at its next hop LSR should be the same whether the packet arrives at the next hop LSR via its working LSP or via its protection LSP and because there are more hops along the protection LSP than the working LSP, the TTL value of packets that are switched to the protection LSP must be adjusted upwards.

In the examples of FIGS. 8 and 9, the TTL value of each packet should be the same whether a packet arrives at LSR B by traversing working LSP A/B or protection LSP A/B. Because the protection LSP requires three more hops (N=3) than the working LSP, the TTL values of packets that traverse the protection LSP are increased by three to account for the additional hops, thereby ensuring that the TTL value of each packet is the same at LSR B whether the packets traversed the working LSP or the protection LSP. Referring to FIG. 8, the TTL value of packets traversing the working LSP may initially be set to two, such that the TTL value is one after being decremented at LSR B. In the embodiment of FIG. 8, a TTL value of zero or one indicates that the packet should no longer be label swapped. If the TTL value of a packet is initially set to two to traverse working LSP A/B, then the adjusted TTL value is set to five (2+3=5) to traverse the protection LSP. The TTL value of the packet is then decremented by one for each label switched hop that is traversed on the protection LSP. FIG. 9 depicts an algorithm for calculating the adjusted TTL value for the example protection LSP of FIG. 8. The TTL adjustment algorithm for each particular protection LSP is pre-established so that the TTL value adjustments can be quickly and easily performed. Once packets with the adjusted TTL values traverse their protection LSP, with their TTL values being decremented at each hop, the TTL values at the destination LSR will be the same values as they would have been if the packets had traversed the corresponding working LSP.

Because all protection LSPs that protect working LSPs on the link between LSRs A and B traverse the same protection route and make the same number of hops, the adjusted TTL values for all protection LSPs for the link between LSRs A and B are generated using the same algorithm. For example, all protection LSPs for the link between LSRs A and B would have an adjusted TTL value that is generated by adding three hops to the working TTL value.

Additional description of an embodiment of protection switching is provided with reference to FIG. 8. Referring to LSR A 830, after packets are switched from the working LSP to the protection LSP, which includes switching the packets from the left side transmit module to the left side receive module, the packets are forwarded across LSR A from the left side receive module to the right side transmit module just as a normal labeled packet. Packets on the protection LSP 828 are transmitted from the right side transmit module of LSR A and traverse the protection LSP, passing through LSRs E, D, and C (838, 836, and 834), and arriving at the left side receive module of LSR B 832. At each LSR, the TTL value of the shim header is decremented by one and the decremented TTL value is included with the output label switched packet. Packets that are received at LSR B on the protection LSP are recognized as packets that should be switched back to working LSPs A/B.

In the embodiment of FIG. 8, switching packets from the protection LSP back to the working LSP at LSR B 832 involves switching the packets from the left side receive module to the right side receive module. In order to switch the packets to the right side receive module of LSR B, the packets are first passed across LSR B to the right side transmit module and then switched to the right side receive module. In the embodiment of FIG. 8, the packets are passed across the LSR from the left side receive module to the right side transmit module because transmission pathways exist within the LSR that can be easily utilized. Once packets are delivered to the right side transmit module, they are switched to the right side receive module. Switching the packets to the right side receive module includes switching the packets from the protection LSP back to the original working LSP and carrying the TTL value from the protection LSP shim header over to the working LSP shim header. For example, packets received on the protection LSP for working LSP A/B are switched back to working LSP A/B with the TTL value from the received packet being carried over. At the right side receive module, packets are treated as if they had traversed the working LSP from LSR A to LSR B (in the clockwise direction). At the right side receive module, because the TTL value (after decrementing) is one, the shim header of the packet is popped and the encapsulated packet is forwarded to Host Y 842 just as it would have been had the packet traversed working LSP A/B. Because the shim header is not popped until the packet is switched back to the original working LSP, the receiving port does not read the inner header and no topography learning (for example, a MAC move) is triggered.

In an embodiment, the switching of packets received on the protection LSP back to the related working LSP is automatic and independent of any link failure indication. For example, LSR B is programmed to switch all packets received on the protection LSP to the related working LSP. Because each LSP has a unique MPLS label, the LSRs can recognize packets received on protection LSPs and automatically switch the packets back to their respective working LSP. Packets received on other LSPs are treated as normal MPLS packets. Again, because packets received on a protection LSP are automatically switched to the working LSP, the inner header is not read and topography learning is not initiated.

By switching packets that are received on a protection LSP back to the respective working LSP and by adjusting the TTL values of packets that are sent on the protection LSP, packets that traverse the protection LSP are quickly and easily returned to the state that they would have been in had the packets traversed the working LSP. Although specific techniques for switching packets from the working LSP to the protection LSP and for switching packets from the protection LSP back to the working LSP have been described, other techniques can be utilized to accomplish the switching without deviating from the invention.

Figure 10:
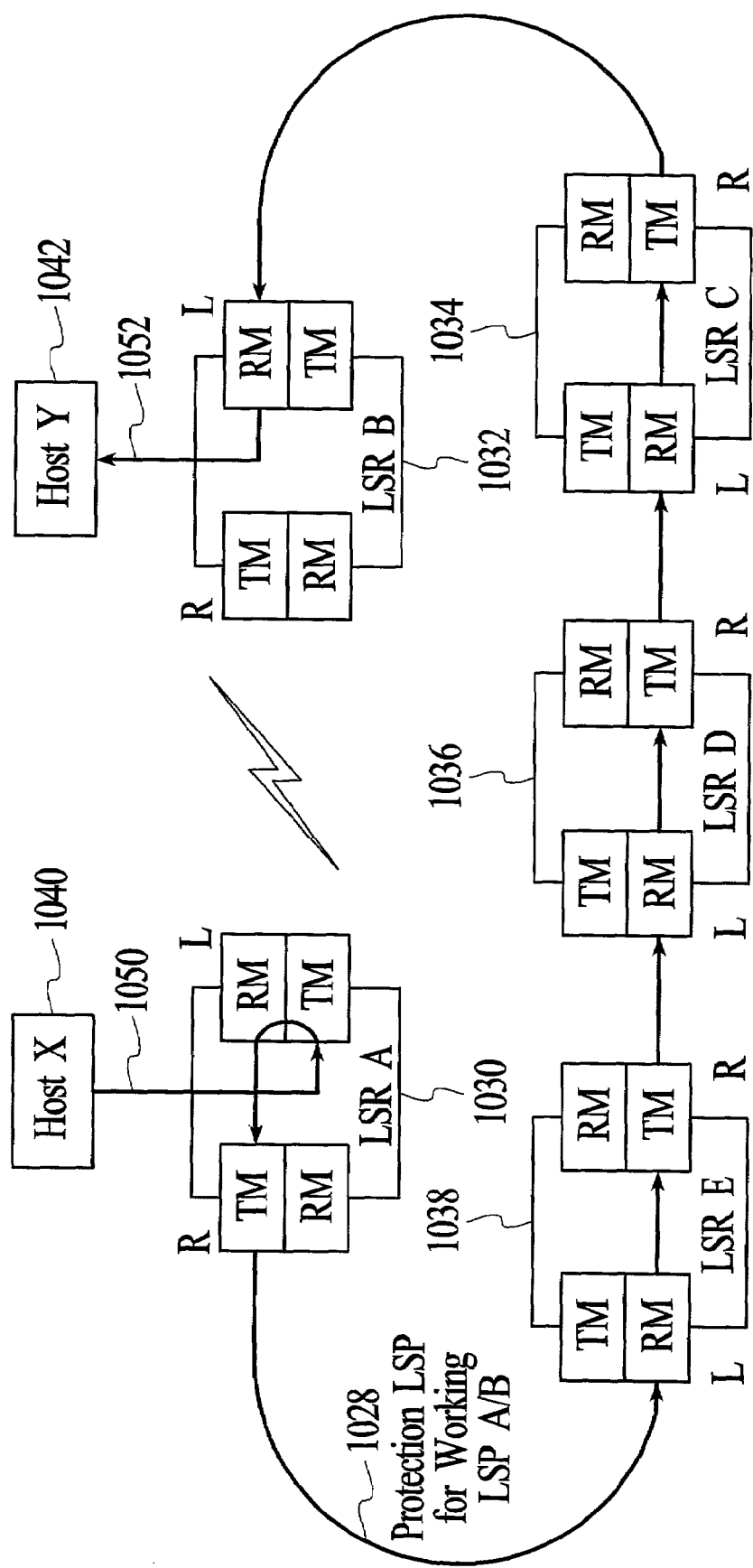
FIG. 10 depicts the ring network of FIG. 6 where the link between LSRs A and B has failed and packets are forwarded to the next hop LSR on the protection LSP and then through the receiving LSR without being switched back to the original working LSP in accordance with another embodiment of the invention.

FIG. 10 depicts an alternative example of how packets received on a protection LSP can be handled. FIG. 10 is identical to FIG. 8 except that packets received at LSR B 1032 on the protection LSP are not switched over to the original working LSP. In the embodiment of FIG. 10, LSR B reads the TTL values of packets received on the protection LSP and recognizes that the packets should not continue to be label switched. For example, TTL values of zero or one indicate that the packets should no longer be label switched. Once packets are recognized as a packet that should not be label switched, the shim headers are popped and the encapsulated packets are forwarded as normal packets. Referring to LSR B, the dark line 1054 between the right side receive module and Host Y 1042 indicates that packets are not switched to the original working LSP as described with reference to FIG. 8.

Operation in the protection mode can be ended in various different ways. In an embodiment, the transmitting LSR is manually changed from using the protection LSP back to using the working LSP and the previously failed link. In another embodiment, the transmitting LSR tries to revert back to the working LSP and the failed link after a specified period of time. In another embodiment, the working LSP is remapped to avoid the failed link.

Although the example described with reference to FIGS. 6–10 involves packets that originate at a source outside of the MPLS domain, any packets that travel around the ring on a working LSP can be protected by the same technique. For example, packets that are passing from working LSP E/A (in the clockwise direction) to working LSP A/B can be protected by the protection LSP A/B in the same manner as described above.

Figure 11:
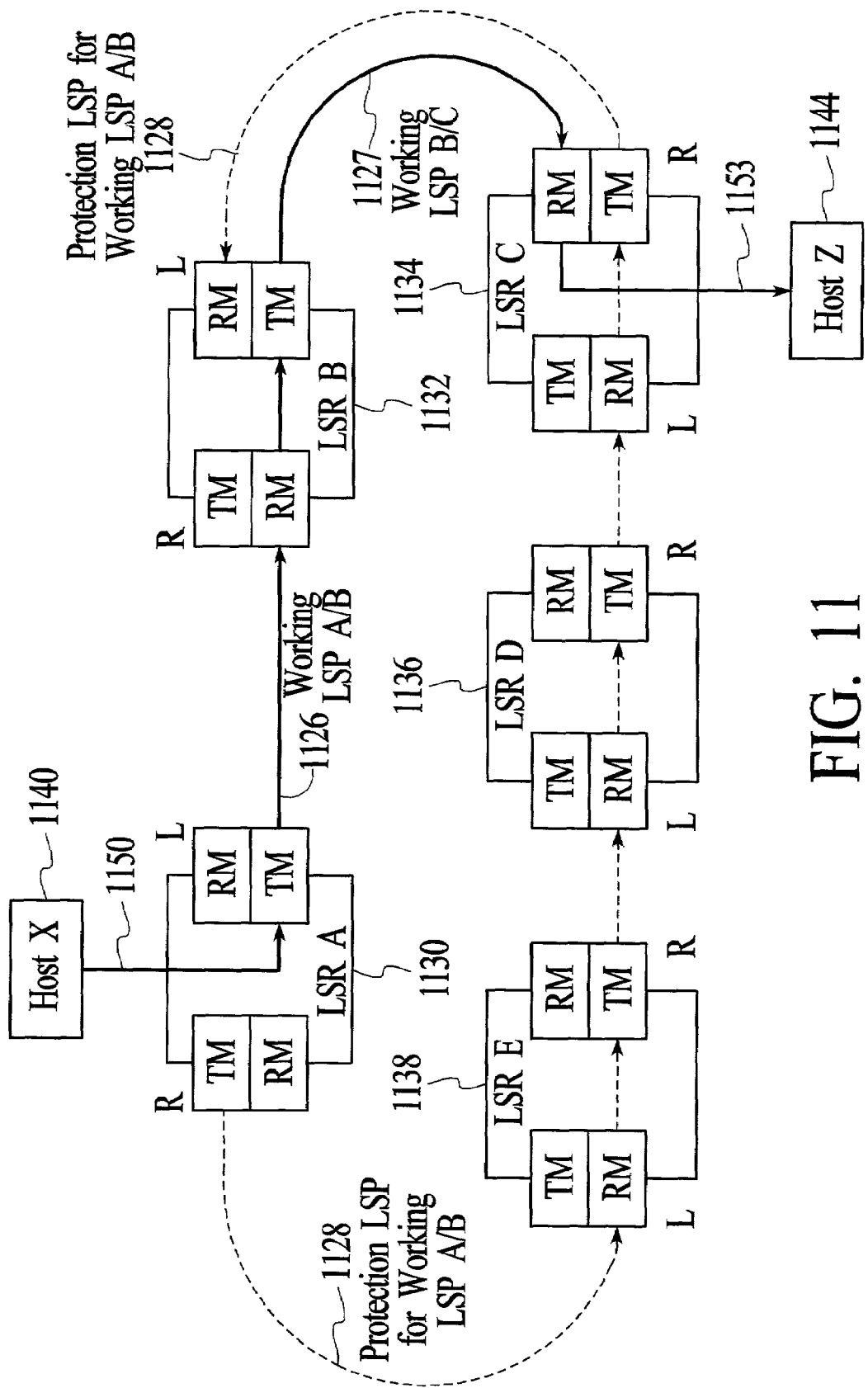
FIG. 11 depicts an expanded view of LSRs on a ring network, with two example working LSPs and an example protection LSP for one of the working LSPs, where the link between LSRs A and B is properly functioning in accordance with an embodiment of the invention.

FIG. 11 depicts an example of protection switching that is similar to the example described with reference to FIGS. 6–10 except that the packets of interest traverse multiple working LSPs within the MPLS domain. Referring to FIG. 11, it is desired to send packets from Host X 1140 to Host Z 1144, both of which are outside of the MPLS domain. The packets are sent from Host X to Host Z via connections 1150 and 1153 between the respective Hosts and LSRs and via working LSPs A/B 1126 and B/C 1127 that are established within the MPLS domain. In the example of FIG. 11, working LSP A/B utilizes the link between LSRs A 1130 and B 1132 and working LSP B/C utilizes the link between LSRs B and C 1134. The protection LSP 1128 for working LSP A/B is described in detail below for example purposes although it should be understood that a similar protection LSP would also be established for working LSP B/C. The protection LSP for working LSP A/B is indicated by the dashed line and runs from LSR A to LSR B in the counterclockwise direction. In the embodiment of FIG. 11, the protection LSP runs from the right side transmit module of LSR A to the left side receive module of LSR B. The protection LSP runs from LSR A to LSR B even though the ultimate destination LSR of the packets of interest is LSR C.

Figure 12:
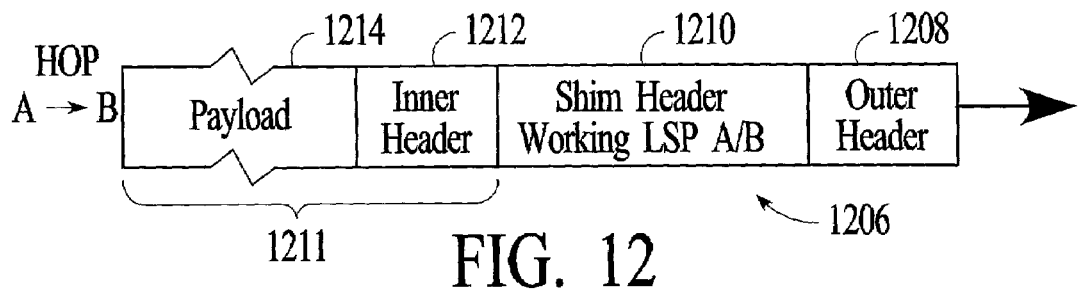
FIG. 12 depicts an example label switched packet that traverses working LSP A/B that is depicted in FIG. 11.

FIG. 12 depicts an example packet 1206 that traverses working LSP A/B. The packet includes an outer header 1208 that is used to traverse working LSP A/B, a shim header 1210 that identifies working LSP A/B, and an encapsulated packet 1211 that includes a header 1212 (referred to as the inner header) and a payload 1214. The TTL value of the shim header is set to a value that relates to the number of label switched hops that the packet is supposed to travel around the ring.

Figure 13:
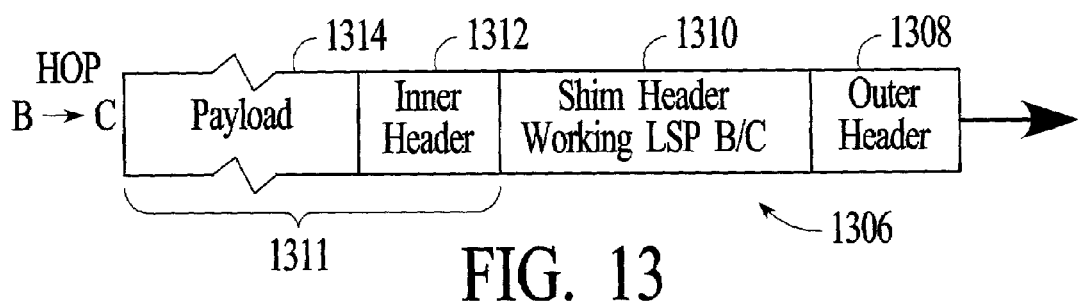
FIG. 13 depicts an example of the label switched packet from FIG. 12 that traverses working LSP B/C that is depicted in FIG. 11.

Similarly, FIG. 13 depicts an example of the packet from FIG. 12 that traverses working LSP B/C. The packet includes an outer header 1308 that is used to traverse working LSP B/C, a shim header 1310 that identifies working LSP B/C, and the encapsulated header 1312 and payload 1314 from FIG. 11. Note that the encapsulated header and payload are not changed or utilized as the packet traverses working LSPs A/B and B/C. Also note that as the encapsulated packet is swapped from LSP A/B to LSP B/C, the TTL value from the incoming packet is used to calculate the TTL value for the outgoing packet. Specifically, the TTL value of the outgoing packet is calculated by decrementing the incoming TTL value by one.

As long as the link that supports working LSP A/B is functioning properly, packets are forwarded from LSR A 1130 to LSR B 1132 on working LSP A/B 1126. However, if there is a failure of the link that is utilized by working LSP A/B, for example a fiber cut or a degradation of the BER, then LSP protection is implemented and packets that were being sent across working LSP A/B are switched to the protection LSP 1128. The switched packets traverse the protection LSP from LSR A to LSR B in the counterclockwise direction.

Figure 14:
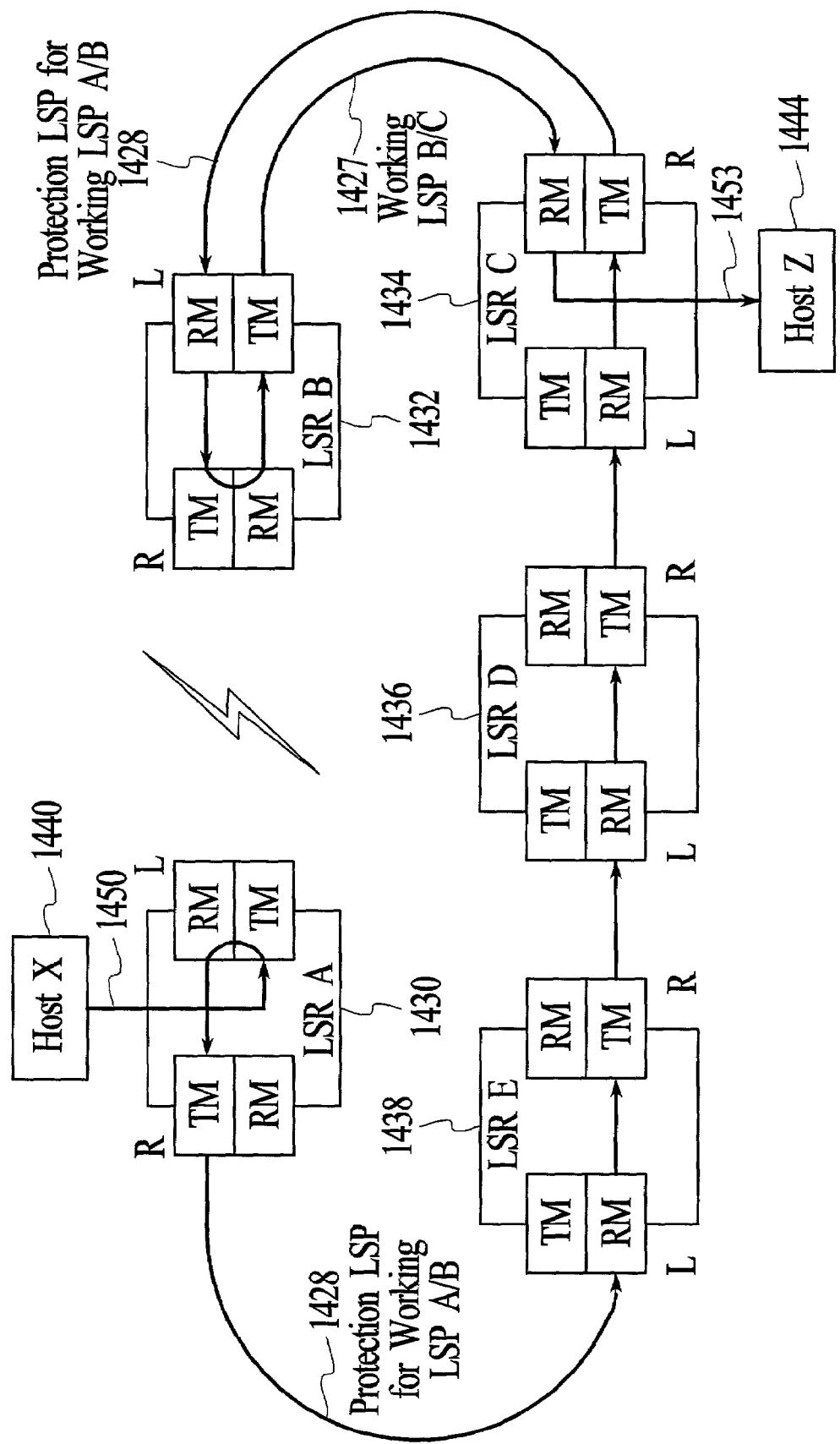
FIG. 14 depicts the ring network of FIG. 11 where the link between LSRs A and B has failed and packets are forwarded from LSR A to LSR B on the protection LSP in accordance with an embodiment of the invention.

FIG. 14 depicts an example of the path that packets traverse when there is a failure of the link between LSRs and A and B. Referring to LSR A 1430, packets that are received from Host X 1440 and intended for working LSP A/B are still delivered to the left side transmit module and working LSP A/B just as if working LSP A/B were in operation. At the left side transmit module, the packets are switched, or "bounced," from working LSP A/B to the protection LSP. In an embodiment, switching the packets from the working LSP to the protection LSP involves switching the packets from the transmit module's buffer to the receive module's buffer and changing the shim header. Changing the shim header involves switching the MPLS label from the working LSP label to the protection LSP label and adjusting the TTL value of the shim header to account for the increase in the number of label switched hops on the protection LSP. Changing the MPLS label from the working LSP to the protection LSP also causes the outer header of the packet to be changed to identify the next hop LSR on the protection LSP.

Figure 15:
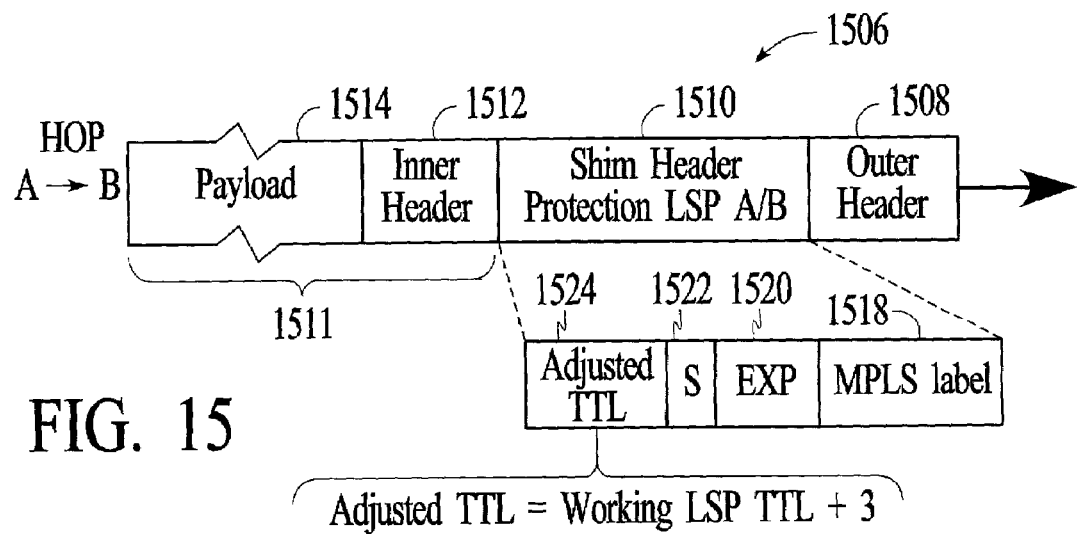
FIG. 15 depicts an example of the label switched packet from FIG. 12 after the packet has been switched from the working LSP to the protection LSP and after the TTL value has been adjusted in accordance with an embodiment of the invention.

FIG. 15 depicts the packet from FIG. 12 after the packet has been switched from the working LSP to the protection LSP. Specifically, the shim header 1510 of the packet is changed from identifying the working LSP A/B to identifying the protection LSP A/B and the outer header 1508 is changed to identify the next hop LSR on the protection LSP. As depicted in the expanded view of the shim header, the TTL value of the shim header is also adjusted, as described above, to account for the additional number of hops that exist between LSR A and LSR B along the protection LSP. In the embodiment of FIG. 14, the original TTL value would be set to three to allow the packet two label switched hops before the shim header is popped at LSR C. The adjusted TTL value is set to six by adding three to the initial TTL value (i.e., 3+3=6). No changes are made to the header 1512 and the payload 1514 of the encapsulated packet 1511.

Referring back to FIG. 14, after packets are switched from the working LSP A/B to the protection LSP A/B 1428, the packets are forwarded across LSR A 1430 from the left side receive module to the right side transmit module just as normal label switched packets. Packets on the protection LSP are transmitted from the right side transmit module of LSR A and traverse the protection LSP, passing through LSRs E, D, and C (1438, 1436, and 1434), and arriving at the left side receive module of LSR B 1432. At each LSR, the TTL value of the shim header is decremented by one and the decremented TTL value is included with the output label switched packet. Packets that are received at LSR B on the protection LSP A/B are recognized by LSR B as packets that should be switched back to working LSP A/B.

In the embodiment of FIG. 14, switching packets from the protection LSP A/B back to the working LSP A/B at LSR B 1432 involves switching the packets from the left side receive module to the right side receive module. In order to deliver the packets to the right side receive module, the packets are first passed across LSR B to the right side transmit module and then switched to the right side receive module. Switching the packets from the right side transmit module to the right side receive module includes switching the packets from the protection LSP back to the original working LSP and carrying the TTL value from the protection LSP shim header over to the working LSP shim header. After packets are switched from the protection LSP to the working LSP, the packets at LSR B that arrived on the protection LSP are the same as the packets, which are described with reference to FIG. 12, that arrived at LSR B on the working LSP. In particular, the TTL values of the packets are the same as they would have been had the packets traversed the working LSP because the TTL value of each packet was adjusted when the packets were switched to the protection LSP. Additionally, because the shim headers are not popped by LSR B, the LSR does not read the inner headers of the incoming packets and no topology learning is triggered by the packets that are received on the protection LSP.

Figure 16:
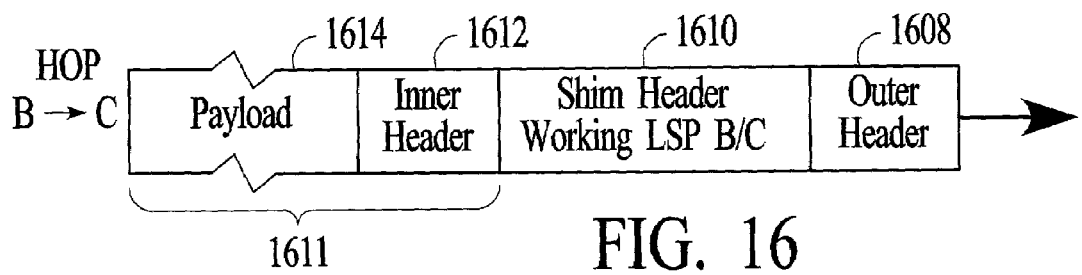
FIG. 16 depicts an example of the label switched packet from FIG. 15 after the packet has been switched from the protection LSP back to the next hop working LSP in accordance with an embodiment of the invention.

Again referring to FIG. 14, after the packets are switched to the right side receive module of LSR B 1432, the packets are transferred across LSR B to the left side transmit module and then put on working LSP B/C 1427. The TTL value that was carried over from the protection LSP shim header is used to set the TTL value for the working LSP B/C shim header. FIG. 16 depicts the packet from FIG. 15 after the shim header is switched to the working LSP B/C. The packet depicted in FIG. 16 is identical to the packet depicted in FIG. 13, including the MPLS label, the TTL value, and the outer header. The packet depicted in FIG. 16 traverses working LSP B/C just as is described with reference to FIGS. 11 and 13 in the case where there is no protection switching needed.

Once a packet on working LSP B/C reaches LSR C 1434, the TTL value of the shim header causes the shim header to be popped and the encapsulated packet is forwarded to Host Z 1444. Referring to FIG. 16 for example, the outer header 1608 is removed and the shim header 1610 is popped, leaving the previously encapsulated packet 1611. The previously encapsulated packet leaves the MPLS domain and is forwarded, as a normal packet, to Host Z.

Figure 17:
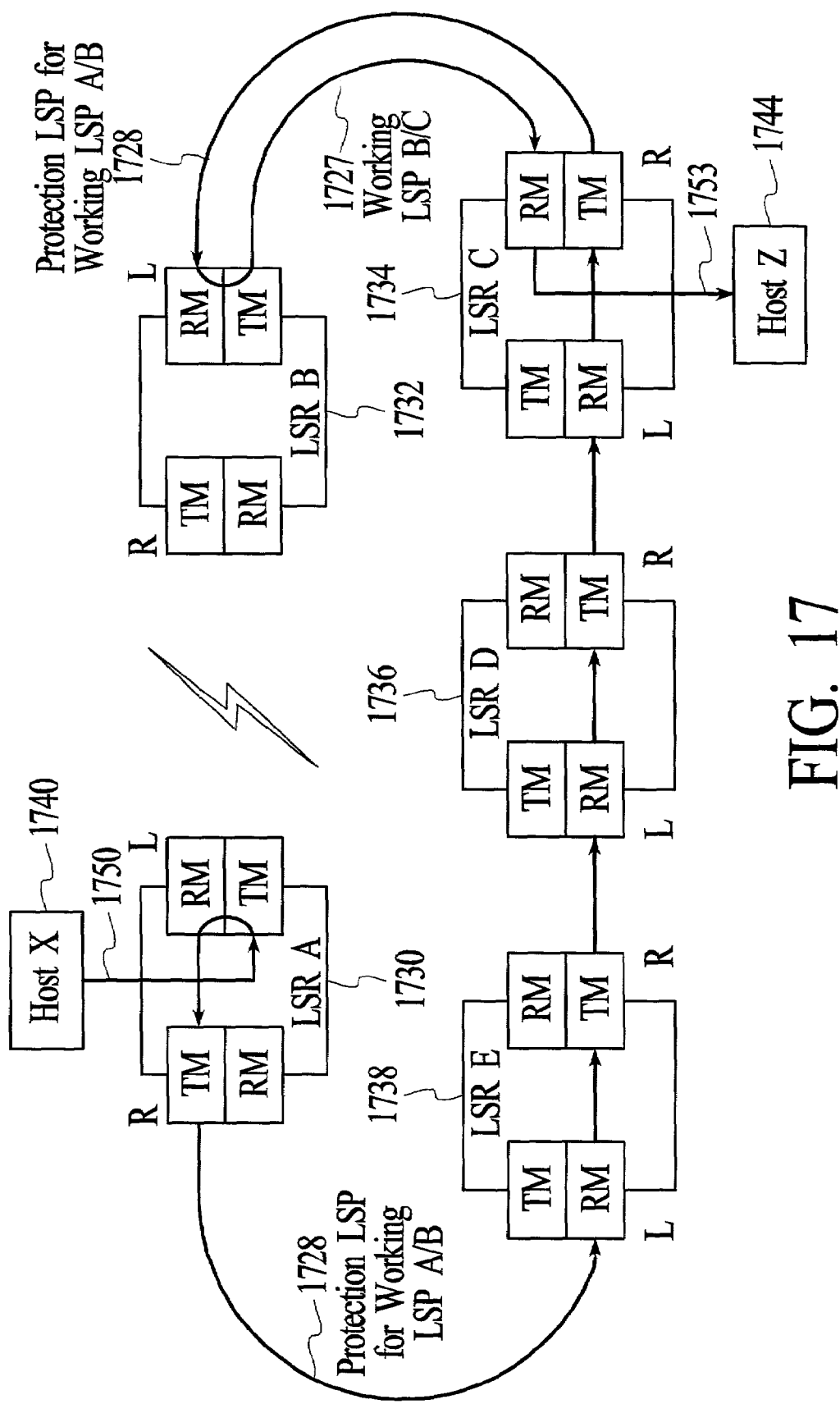
FIG. 17 depicts the ring network of FIG. 11 where the link between LSRs A and B has failed and packets are forwarded from LSR A to LSR B on the protection LSP without being switched back to the original working LSP in accordance with another embodiment of the invention.

FIG. 17 depicts an alternative example of how packets received on a protection LSP can be handled. FIG. 17 is identical to FIG. 14 except that packets received on the protection LSP are not switched over to the original working LSP. In the embodiment of FIG. 17, LSR B 1732 reads the TTL values of packets received on the protection LSP and recognizes that the packets still require label switching. For example, if the TTL values (after decrementing) of the packets are greater than one, then the packets still require label switching. Instead of switching the packets to the original working LSP, which involves switching the packets to the right side receive module of LSR B, the packets can be switched directly to the next hop working LSP. In the embodiment of FIG. 17, packets are switched from the protection LSP to the next hop working LSP by switching the packets from the left side receive module buffer to the left side transmit module buffer and changing the shim header. Changing the shim header involves switching the MPLS label of the shim header from the protection LSP label to the next hop working LSP label and setting the TTL value to the decremented value of the incoming TTL value.

Figure 18:
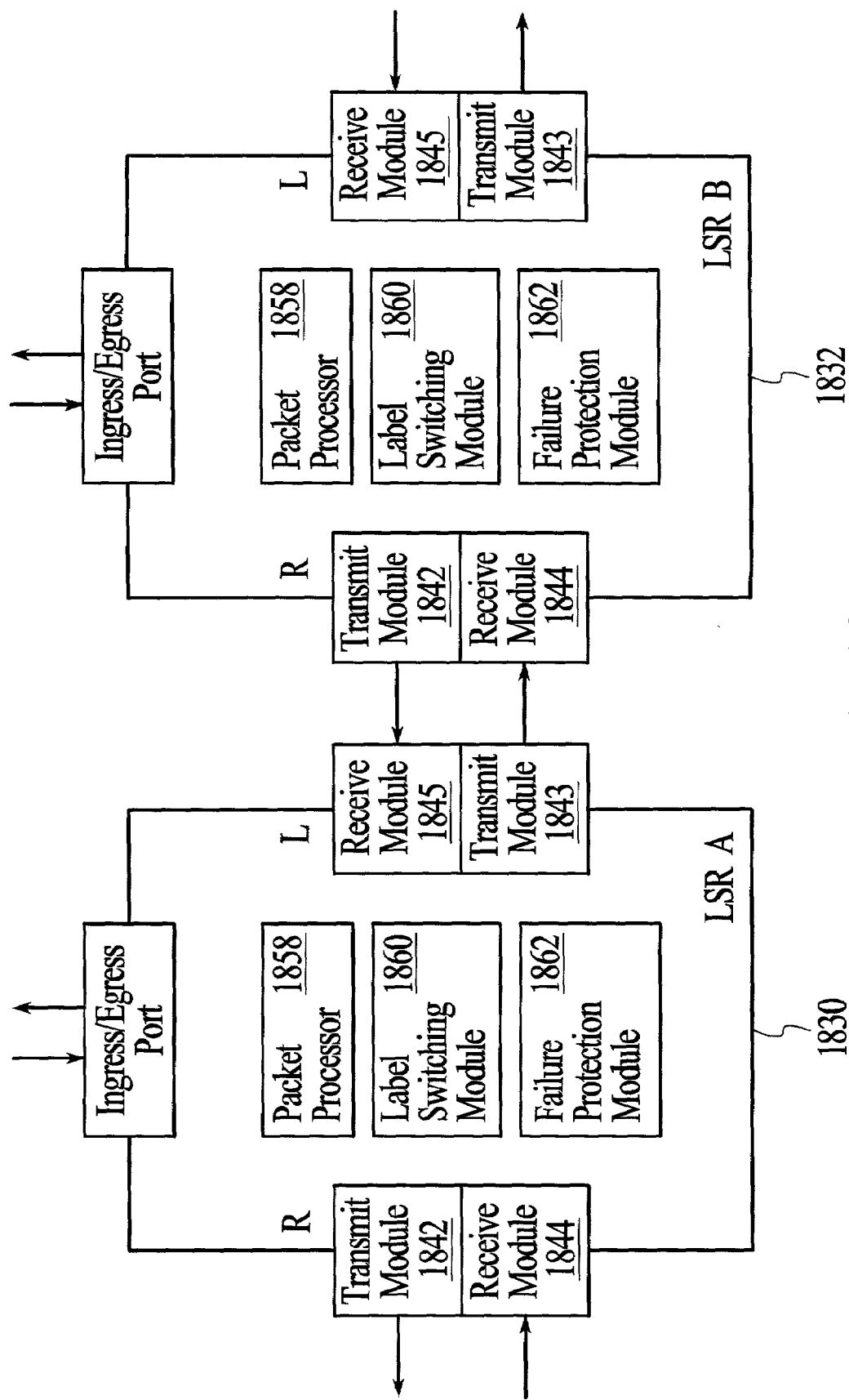
FIG. 18 depicts an expanded view of two neighbor LSRs on a ring network that include failure protection modules in accordance with an embodiment of the invention.

FIG. 18 depicts an expanded view of two neighbor LSRs 1830 and 1832 on the ring network of FIG. 3. Each LSR includes right side transmit and receive modules 1842 and 1844, left side transmit and receive modules 1843 and 1845, a packet processor 1858, a label switching module 1860, and a failure protection module 1862.

The packet processors 1858 manage the packets that are switched within the LSRs. Specifically, the packet processors handle the Data Link layer and Network layer functions that are carried out by the LSRs.

The label switching modules 1860 manage the label switching functions of the LSR. Specific functions of the label switching modules include generating the shim headers for packets, establishing forwarding equivalency classes (FECs), decrementing the TTL values, providing label values, and maintaining a label information base. In an embodiment of the invention, the function of penultimate hop popping is disabled so that continuity of the TTL values is maintained.

Another function of the label switching modules 1860 is to learn the topology of the MPLS domain. Many different protocols can be used by ring LSRs to communicate topology information to other LSRs on the ring. In an embodiment, each LSR on the ring sends periodic advertisement messages to its left and right neighbors with information regarding the topology of the ring. Information included within the advertisement messages may include; the number of LSRs on the ring, the MAC addresses of LSRs on the ring, the type of links that are to the right and left of the LSRs, and left and right side traffic information for the LSRs on the ring.

Another function of the label switching modules 1860 is to stitch TTL values for incoming packets to the decremented TTL values for the same outgoing packets. That is, the TTL value of a label switched packet at the transmit module of an LSR should be the decremented value of the TTL value for the same packet at the receive module of the LSR. Referring to FIG. 18 for example, the TTL value of a packet received at the right side receive module of LSR A and traveling to LSR B is decremented before the packet is transmitted from the LSR. The TTL values for ring packets must be decremented at every hop. In an embodiment, the label switching module ensures that the TTL values of ring packets are decremented when the packets are received and that the TTL values are stitched across the ring LSRs before the ring packets are output on the next ring LSP. Decrementing of TTL values before ring packets are output on the next ring LSP is described in the patent application entitled, "Method and System for Preventing Transmission Loops in a Label Switching Domain," Ser. No. 09/865,035, which is assigned to the assignee of the current invention and incorporated by reference herein. In an embodiment, the TTL stitching is performed by a hardware device. The label switching modules may include software, hardware, or any combination thereof.

The failure protection modules 1862 manage the failure protection functions that are described above with reference to FIGS. 3–17. In an embodiment, all LSRs on the ring must include a failure protection module to ensure that failure protection is properly carried out. Specific functions of the failure protection modules include establishing the protection LSPs, switching packets from working LSPs to protection LSPs and from protection LSPs back to working LSPs, and adjusting TTL values. The label switching modules may include software, hardware, or any combination thereof.

Although MPLS is described as the label switching protocol for example purposes, the invention can be implemented with any label switching protocol that utilizes labels, or an equivalent, and TTL fields, or equivalent.

Figure 19:
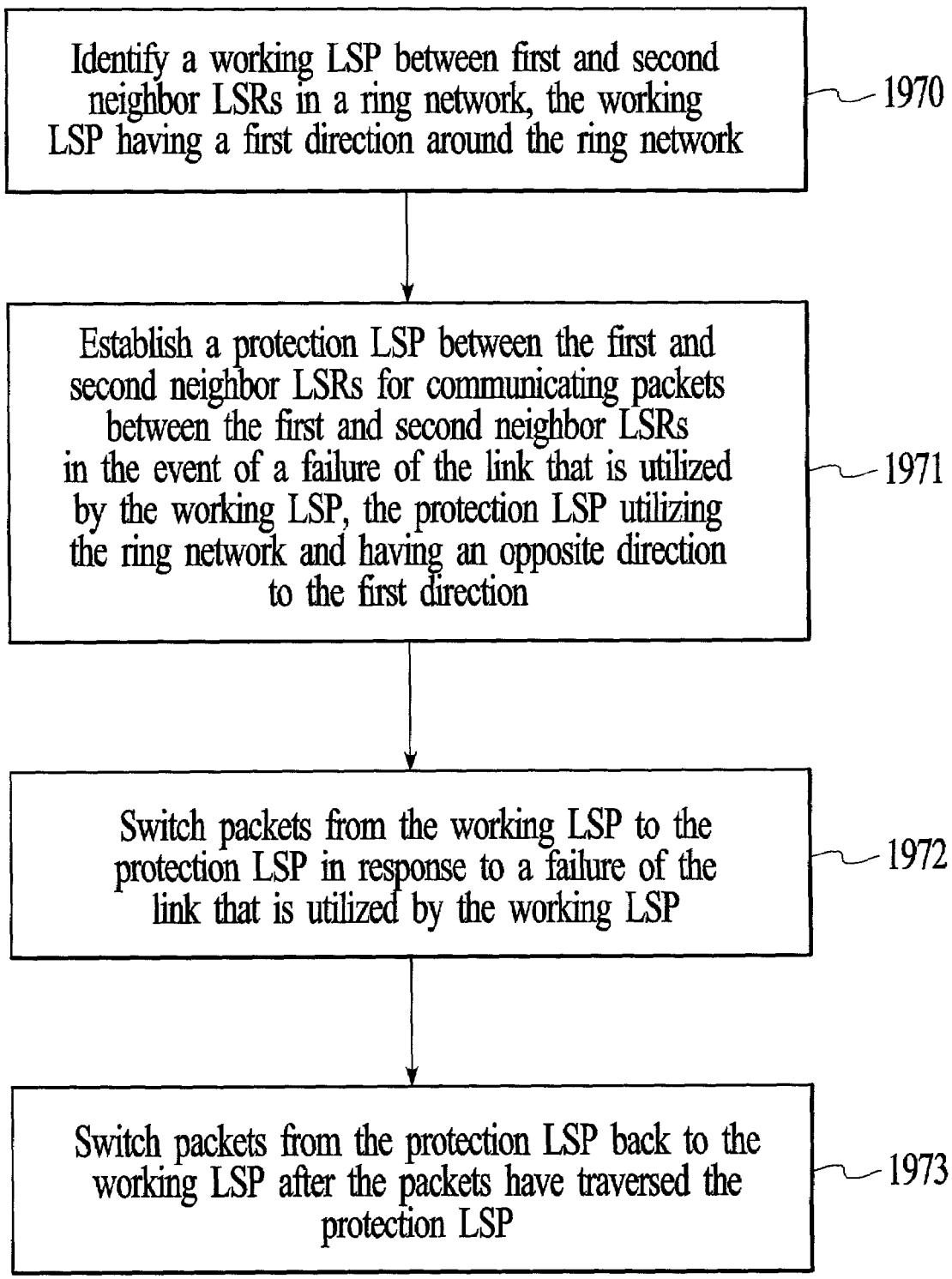
FIG. 19 depicts a process flow diagram of a method for protecting an LSP between two LSRs in a ring network that utilizes label switching in accordance with an embodiment of the invention.

FIG. 19 depicts a process flow diagram of a method for protecting an LSP between two LSRs in a ring network that utilizes label switching. At step 1970, a working LSP is identified between first and second neighbor LSRs in a ring network, the working LSP having a first direction around the ring network. At step 1971, a protection LSP is established between the first and second neighbor LSRs for communicating packets between the first and second neighbor LSRs in the event of a failure of the link that is utilized by the working LSP, the protection LSP utilizing the ring network and having an opposite direction to the first direction. At step 1972, packets are switched from the working LSP to the protection LSP in response to a failure of the link that is utilized by the working LSP. At step 1973, packets are switched from the protection LSP back to the working LSP after the packets have traversed the protection LSP.

FIG. 20 depicts a process flow diagram of another method for protecting an LSP between two LSRs in a ring network that utilizes label switching. At step 2074, a working LSP is identified between first and second neighbor LSRs in a ring network, the working LSP having a first direction around the ring network. At step 2075, a protection LSP is established between the first and second neighbor LSRs for communicating packets between the first and second neighbor LSRs in the event of a failure of the link that is utilized by the working LSP, the protection LSP utilizing the ring network and having an opposite direction to the first direction. At step 2076, packets are switched from the working LSP to the protection LSP in response to a failure of the link that is utilized by the working LSP. At step 2077, the TTL values of the switched packets are adjusted by a value that is a function of the number of LSRs along the protection LSP. At step 2078, packets are switched back to the working LSP from the protection LSP after the packets have traversed the protection LSP. At step 2079, the TTL values from packets that have traversed the protection LSP are used to generate TTL values for the packets that are switched back to the working LSP from the protection LSP.

Although specific embodiments of the invention have been described and illustrated, the invention is not limited to the specific forms and arrangements of parts so described and illustrated. The invention is limited only by the claims.

What is claimed is:

1. A method for protecting a label switched path (LSP) between two label switch routers (LSRs) in a ring network that utilizes multiprotocol label switching (MPLS) to communicate packets of information, wherein each LSR in said ring network is connected to a right side neighbor LSR and a left side neighbor LSR by respective links, said method comprising:

identifying a working LSP between first and second neighbor LSRs in said ring network, said working LSP having a first direction around said ring network;

establishing a protection LSP between said first and second neighbor LSRs for communicating packets between said first and second neighbor LSRs in the event of a failure of the link that is utilized by said working LSP, said protection LSP utilizing said ring network and having an opposite direction to said first direction;

switching packets from said working LSP to said protection LSP in response to a failure of said link that is utilized by said working LSP, wherein switching packets from said working LSP to said protection LSP includes adjusting time-to-live (TTL) values of said packets to account for the number of LSRs that are alone said protection LSP;

switching packets from said protection LSP to a next hop working LSP after said packets have traversed said protection LSP; and using TTL values from packets that have traversed said protection LSP to generate TTL values for said packets that are switched to said next hop working LSP from said protection LSP.

2. The method of claim 1 wherein switching packets from said working LSP to said protection LSP includes switching the label of a packet from a working label to a protection label.

3. The method of claim 1 wherein adjusting said TTL values includes adding N to said TTL values, where N is a function of the number of LSRs along said protection LSP.

4. The method of claim 1 further including establishing at least one protection LSP for each link between neighbor LSRs on said ring network.

5. A system for protecting a label switched path (LSP) between two label switch routers (LSRs) in a ring network that utilizes multiprotocol label switching (MPLS) to communicate packets of information between LSRs in said ring network, wherein each LSR in said ring network is connected to a right side neighbor LSR and a left side neighbor LSR by respective links, each LSR in said ring network comprising:

a label switching module, associated with an LSR, for identifying a working LSP between said LSR and a neighbor LSR, said working LSP having a first direction around said ring network; and a failure protection module for:

establishing a protection LSP between said LSR and said neighbor LSR that enables packets to be communicated between said LSR and said neighbor LSR in the event of a failure of the link that is utilized by said working LSP, said protection LSP utilizing said ring network and having an opposite direction to said first direction;

switching packets from said working LSP to said protection LSP in response to a failure of said link that is utilized by said working LSP, wherein switching packets from said working LSP to said protection LSP includes adjusting TTL values of said packets to account for the number of LSRs that are along said protection LSP;

switching packets from a protection LSP to a next hop working LSP after said packets have traversed said protection LSP; and using TTL values from packets that have traversed said protection LSP to generate TTL values for said packets that are switched to said next hop working LSP from said protection LSP.

6. The system of claim 5 wherein switching packets from said working LSP to said protection LSP includes switching the label of a packet from a working label to a protection label.

7. The system of claim 5 wherein adjusting said TTL values includes adding N to said TTL values, where N is a function of the number of LSRs along said protection LSP.

8. The system of claim 5 wherein said failure protection module includes logic for establishing unique protection LSPs for working LSPs that utilize the link between said LSR and said neighbor LSR.

9. A method for protecting a label switched path (LSP) between two label switch routers (LSRs) in a ring network that utilizes multinrotocol label switching to communicate packets of information, wherein each LSR in said ring network is connected to a right side neighbor LSR and a left side neighbor LSR by respective links, said method comprising:

identifying a working LSP between first and second neighbor LSRs in said ring network, said working LSP having a first direction around said ring network;

establishing a protection LSP between said first and second neighbor LSRs for communicating packets between said first and second neighbor LSRs in the event of a failure of the link that is utilized by said working LSP, said protection LSP utilizing LSRs on said ring network and having an opposite direction to said first direction;

switching packets from said working LSP to said protection LSP in response to a failure of said link that is utilized by said working LSP;

adjusting TTL values of said switched packets by a value that is a function of the number of LSRs along said protection LSP;

switching packets from said protection LSP to a next hop working LSP after said packets have traversed said protection LSP; and using TTL values from packets that have traversed said protection LSP to generate TTL values for said packets that are switched to said next hop working LSP from said protection LSP.

10. The method of claim 9 wherein adjusting TTL values includes adding N to said TTL values, where N is a function of the number of LSRs along said protection LSP.

11. The method of claim 9 further including establishing at least one protection LSP for each link between neighbor LSRs on said ring network.

* * * * *